(12) United States Patent
Buchan et al.

(10) Patent No.: US 12,399,888 B2
(45) Date of Patent: Aug. 26, 2025

(54) SYSTEMS AND METHODS FOR IMPLEMENTING INTELLIGENT LOADING OF DATA

(71) Applicant: WORLDR TECHNOLOGIES LIMITED, Slough (GB)

(72) Inventors: Maximilian Alastair Buchan, Slough (GB); Dzmitry Maskaliou, Slough (GB); Michael Antipin, Slough (GB); Yann Golanski, Slough (GB)

( * ) Notice: Subject to any disclaimer, the term of this patent is extended or adjusted under 35 U.S.C. 154(b) by 37 days.

(21) Appl. No.: 17/857,795

(22) Filed: Jul. 5, 2022

(65) Prior Publication Data

US 2023/0004554 A1 Jan. 5, 2023

(30) Foreign Application Priority Data

Jul. 2, 2021 (GB) ...................................... 2109577

(51) Int. Cl.
*G06F 16/23* (2019.01)
*G06F 9/451* (2018.01)

(52) U.S. Cl.
CPC .......... *G06F 16/2372* (2019.01); *G06F 9/451* (2018.02); *G06F 16/2358* (2019.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 7,797,279 | B1* | 9/2010 | Starling | G06F 11/1451 707/641 |
| 8,990,162 | B1* | 3/2015 | Kushwah | G06F 11/1469 707/646 |
| 9,639,430 | B2* | 5/2017 | Peretz | G06F 11/1461 |
| 2012/0254117 | A1* | 10/2012 | Kishi | G06F 11/1451 707/640 |
| 2015/0120662 | A1* | 4/2015 | Dai | H04L 51/216 707/634 |
| 2015/0195220 | A1* | 7/2015 | Hawker | H04L 51/216 707/723 |
| 2015/0256504 | A1* | 9/2015 | Beausoleil | H04L 51/42 709/206 |
| 2020/0120097 | A1* | 4/2020 | Amitay | G06F 3/0482 |
| 2021/0200866 | A1* | 7/2021 | Strogov | G06F 21/568 |
| 2021/0320794 | A1* | 10/2021 | Auh | G06F 16/9024 |

* cited by examiner

*Primary Examiner* — Richard L Bowen
(74) *Attorney, Agent, or Firm* — RC Trademark Company

(57) ABSTRACT

Disclosed is a system for implementing intelligent loading of data in client application database, the system comprising: client device(s) configured to execute client application associated with the client application database and target server communicably coupled to client device(s), wherein, upon start-up, client application is configured to: determine whether data is present or not in client application database, data comprising content of communication thread(s); when data is present in client application database, obtain from target server, updated version of data using first process, wherein the first process is based on recent updates or incremental updates; and when data is not present in client application database, obtain from target server, updated version of data using second process, wherein the second process is based on recent updates.

17 Claims, 2 Drawing Sheets

SYSTEMS AND METHODS FOR IMPLEMENTING INTELLIGENT LOADING OF DATA

TECHNICAL FIELD

The present disclosure relates to systems for implementing intelligent loading of data in client application databases. The present disclosure also relates to methods for implementing intelligent loading of data in client application databases. The present disclosure also relates to computer program products for implementing intelligent loading of data in client application databases. The present disclosure also relates to client devices arranged to be used in systems for implementing intelligent loading of data in client application databases. The present disclosure also relates to target servers arranged to be used in systems for implementing intelligent loading of data in client application databases.

BACKGROUND

Over the past few decades, data loading technology has gained popularity due to continued technological advancements in data management. As the world is evolving at a rapid pace, a huge amount of data is being produced and stored globally, on a regular basis. Therefore, techniques for on-demand loading (i.e., access and retrieval) of such data are being developed and improved to match trends in such evolution. For example, techniques for data loading are being developed to present up-to-date data to users associated with numerous fields, for example, businesses, social networks, internet of things, e-commerce, and the like.

However, existing techniques for data loading have several problems associated therewith. Firstly, the existing techniques require complete loading of an entirety of the data on devices (such as, mobile phones, computers, laptops, tablets, and the like) associated with the users, in order to present the data to the users. This needs considerable data loading time, and hence the data is presented to the users with huge latencies/delays. These latencies/delays adversely affect the users' experience of accessing the data. Moreover, loading the entirety of data on the devices in such a manner is computationally intensive, thus it requires considerable network bandwidth and high power. Secondly, when the users utilise multiple devices for accessing same data, some existing techniques lack efficiency in synchronising the same data on the multiple devices. This adversely affect users' experiences in accessing the same data on the multiple devices. As an example, when a business communication application is accessed by a user on a computer and a mobile phone, there may a lack of synchronism in terms of updation of chat lists, appearance of last messages in the chat lists, updation of chat members lists, and the like, between the computer and the mobile phone. Thirdly, the existing techniques for data loading are unreliable and error-prone in terms of loading the data when there occur situations like temporary unavailability of a communication network, for example, in case of a communication network disruption or intermittent crashes of the communication network.

Therefore, in light of the foregoing discussion, there exists a need to overcome the aforementioned drawbacks associated with existing techniques for data loading.

SUMMARY

The present disclosure seeks to provide a system for implementing intelligent loading of data in a client application database. The present disclosure also seeks to provide a method for implementing intelligent loading of data in a client application database. The present disclosure also seeks to provide a computer program product for implementing intelligent loading of data in a client application database. The present disclosure also seeks to provide a client device arranged to be used in a system for implementing intelligent loading of data in a client application database. The present disclosure also seeks to provide a target server arranged to be used in a system for implementing intelligent loading of data in a client application database. An aim of the present disclosure is to provide a solution that overcomes at least partially the problems encountered in prior art.

In one aspect, an embodiment of the present disclosure provides a system for implementing intelligent loading of data in a client application database, the system comprising:
- at least one client device configured to execute a client application, the client application being associated with the client application database; and
- a target server communicably coupled to the at least one client device,
- wherein, upon start-up, the client application is configured to:
  - determine whether the data is present or not in the client application database, the data comprising content of at least one communication thread, wherein a user using the client application on the at least one client device is a member of the at least one communication thread;
  - when the data is present in the client application database, obtain from the target server, an updated version of the data using a first process, wherein the first process is based on recent updates or incremental updates; and
  - when the data is not present in the client application database, obtain from the target server, the updated version of the data using a second process, wherein the second process is based on recent updates.

In another aspect, an embodiment of the present disclosure provides a method for implementing intelligent loading of data in a client application database, the method being implemented by a system comprising at least one client device configured to execute a client application, the client application having a client application database associated therewith, and a target server communicably coupled to the at least one client device, the method comprising:
- upon start-up of the client application,
  - determining whether the data is present or not in the client application database, the data comprising content of at least one communication thread, wherein a user using the at least one client device is a member of the at least one communication thread;
  - when the data is present in the client application database, obtaining from the target server, an updated version of the data using a first process, wherein the first process is based on recent updates or incremental updates; and
  - when the data is not present in the client application database, obtaining from the target server, the updated version of the data using a second process, wherein the second process is based on recent updates.

In yet another aspect, an embodiment of the present disclosure provides a computer program product for implementing intelligent loading of data in a client application database, the computer program product comprising a non-transitory machine-readable data storage medium having stored thereon program instructions that, when accessed by a processing device, cause the processing device to:

upon start-up of a client application,
determine whether the data is present or not in the client application database, the data comprising content of at least one communication thread, wherein a user using the processing device is a member of the at least one communication thread;
when the data is present in the client application database, obtain from a target server, an updated version of the data using a first process, wherein the first process is based on recent updates or incremental updates; and
when the data is not present in the client application database, obtain from the target server, the updated version of the data using a second process, wherein the second process is based on recent updates.

In still another aspect, an embodiment of the present disclosure provides a client device arranged to be used in a system for implementing intelligent loading of data in a client application database, the system comprising at least one client device configured to execute a client application, wherein the client application is associated with the client application database, and a target server communicably coupled to the at least one client device, wherein, upon start-up, the client application is configured to:
determine whether the data is present or not in the client application database, the data comprising content of at least one communication thread, wherein a user using the client application on the at least one client device is a member of the at least one communication thread;
when the data is present in the client application database, obtain from the target server, an updated version of the data using a first process, wherein the first process is based on recent updates or incremental updates; and
when the data is not present in the client application database, obtain from the target server, the updated version of the data using a second process, wherein the second process is based on recent updates.

In yet another aspect, an embodiment of the present disclosure provides a target server arranged to be used in a system for implementing intelligent loading of data in a client application database, the system comprising at least one client device configured to execute a client application, wherein the client application is associated with the client application database, and the target server communicably coupled to the at least one client device, wherein, upon start-up of the client application:
the client application is configured to determine whether the data is present or not in the client application database, the data comprising content of at least one communication thread, wherein a user using the client application on the at least one client device is a member of the at least one communication thread;
when the data is present in the client application database, the target server is configured to send to the client application, an updated version of the data using a first process, wherein the first process is based on recent updates or incremental updates; and
when the data is not present in the client application database, the target server is configured to send to the client application, an updated version of the data using a second process, wherein the second process is based on recent updates.

Embodiments of the present disclosure substantially eliminate or at least partially address the aforementioned problems in the prior art, and enable efficient, accurate, and reliable loading of data in the client application database, in real time or near real time with minimal latency/delay.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
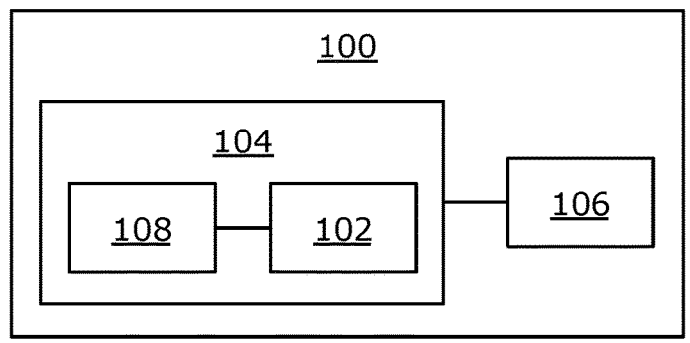
FIG. 1 illustrates a block diagram of architecture of a system for implementing intelligent loading of data in a client application database, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for implementing intelligent loading of data in a client application database, the system comprising:

at least one client device configured to execute a client application, the client application being associated with the client application database; and a target server communicably coupled to the at least one client device, wherein, upon start-up, the client application is configured to:
- determine whether the data is present or not in the client application database, the data comprising content of at least one communication thread, wherein a user using the client application on the at least one client device is a member of the at least one communication thread;
- when the data is present in the client application database, obtain from the target server, an updated version of the data using a first process, wherein the first process is based on recent updates or incremental updates; and
- when the data is not present in the client application database, obtain from the target server, the updated version of the data using a second process, wherein the second process is based on recent updates.

In another aspect, an embodiment of the present disclosure provides a method for implementing intelligent loading of data in a client application database, the method being implemented by a system comprising at least one client device configured to execute a client application, the client application having a client application database associated therewith, and a target server communicably coupled to the at least one client device, the method comprising:

upon start-up of the client application,
- determining whether the data is present or not in the client application database, the data comprising content of at least one communication thread, wherein a user using the at least one client device is a member of the at least one communication thread;
- when the data is present in the client application database, obtaining from the target server, an updated version of the data using a first process, wherein the first process is based on recent updates or incremental updates; and
- when the data is not present in the client application database, obtaining from the target server, the updated version of the data using a second process, wherein the second process is based on recent updates.

In yet another aspect, an embodiment of the present disclosure provides a computer program product for implementing intelligent loading of data in a client application database, the computer program product comprising a non-transitory machine-readable data storage medium having stored thereon program instructions that, when accessed by a processing device, cause the processing device to:

upon start-up of a client application,
- determine whether the data is present or not in the client application database, the data comprising content of at least one communication thread, wherein a user using the processing device is a member of the at least one communication thread;
- when the data is present in the client application database, obtain from a target server, an updated version of the data using a first process, wherein the first process is based on recent updates or incremental updates; and
- when the data is not present in the client application database, obtain from the target server, the updated version of the data using a second process, wherein the second process is based on recent updates.

In still another aspect, an embodiment of the present disclosure provides a client device arranged to be used in a system for implementing intelligent loading of data in a client application database, the system comprising at least one client device configured to execute a client application, wherein the client application is associated with the client application database, and a target server communicably coupled to the at least one client device, wherein, upon start-up, the client application is configured to:
- determine whether the data is present or not in the client application database, the data comprising content of at least one communication thread, wherein a user using the client application on the at least one client device is a member of the at least one communication thread;
- when the data is present in the client application database, obtain from the target server, an updated version of the data using a first process, wherein the first process is based on recent updates or incremental updates; and
- when the data is not present in the client application database, obtain from the target server, the updated version of the data using a second process, wherein the second process is based on recent updates.

In yet another aspect, an embodiment of the present disclosure provides a target server arranged to be used in a system for implementing intelligent loading of data in a client application database, the system comprising at least one client device configured to execute a client application, wherein the client application is associated with the client application database, and the target server communicably coupled to the at least one client device, wherein, upon start-up of the client application:
- the client application is configured to determine whether the data is present or not in the client application database, the data comprising content of at least one communication thread, wherein a user using the client application on the at least one client device is a member of the at least one communication thread;
- when the data is present in the client application database, the target server is configured to send to the client application, an updated version of the data using a first process, wherein the first process is based on recent updates or incremental updates; and
- when the data is not present in the client application database, the target server is configured to send to the client application, an updated version of the data using a second process, wherein the second process is based on recent updates.

The present disclosure provides the aforementioned method, the aforementioned system, and the aforementioned computer program product for implementing intelligent loading of data in a client application database. The present disclosure also provides the client device and the target server arranged to be used in the aforementioned system. Herein, the system employs a requisite technical process for obtaining the updated version of the data upon at least start-up of the client application, wherein the requisite technical process is based on recent updates or incremental updates. These updates can be used directly as the updated version of the data or can be easily added to existing data present in the client application database for generating the updated version of the data. Beneficially, this facilitates in obtaining the updated version of the data, in real time or near-real time with minimal latency/delay which is imperceptible to the user. This improves user's experience when the user uses the client application as an up-to-date content of the at least one communication thread would be readily presented to the user when the user uses the client application on the at least one client device to access such content. The system enables in obtaining the updated version of the data, from the target server, with minimal network bandwidth requirements, less power, and minimum loading time. Moreover, the system is optionally well suited for accurately and efficiently synchronising same data on several client devices that are configured to execute a same client application. The user is therefore able to access updated versions of the same data on each of the several client devices. The client application is also able to optionally sync-up effectively for obtaining the updated version of the data even on occurrence of situations like temporary unavailability of a communication network, or similar. The method adopts a customized data loading approach for improving user experience. The method is fast, effective, reliable and can be implemented and used easily.

The system enables intelligent loading of the data in the client application database. The phrase "intelligent loading of the data" means that the system employs a requisite technical approach (namely, a requisite technical process) for loading of the data depending on requirements of the client application, instead of a typical one-algorithm-suits-all-cases approach. Beneficially, in such a case, the loading of the data is performed in real time or near real time with minimal latency/delay, which is imperceptible to the user, thereby improving user's experience when the user uses the client application.

Throughout the present disclosure, the term "client device" refers to a computing device that is associated with the user and is capable of executing the client application. Optionally, the at least one client device comprises a processor that is configured to execute the client application. Optionally, the at least one client device is at least one of: a smartphone, a tablet, a laptop, a desktop-computer, a workstation. It will be appreciated that in some instances, the user could use a single client device, whereas in other instances, the user could use a plurality of client devices.

Throughout the present disclosure, the term "client application" refers to a software application that comprises a set of instructions which are executable to perform steps of the aforementioned method. Optionally the client application pertains to at least one of: business communication, social networking communication, internet of things (IoT) communication, e-commerce communication, healthcare communication, reservation communication, banking communication. It will be appreciated that the client application could also pertain to other suitable domains besides the ones listed hereinabove. In a first example, the client application may be a business communication application executing on two client devices such as a smartphone and a desktop-computer that are associated with the user.

Throughout the present disclosure, the term "client application database" refers a systematic collection of the data that is associated with the client device. In use, the client device fetches the data from the client application database and/or stores the data into client application database. It will be appreciated that the client application database may have no data or may have some data (which may or may not be in updated form) at a time of at least start-up of the client application. Optionally, the client application database is implemented at a local memory associated with the at least one client device. Examples of such a local memory may include, but are not limited to, a Solid State Drive (SSD) memory (such as a flash memory, a memory stick, a Secure Digital (SD) card, and the like), a hard disk drive (HDD) memory, a floppy disk, a portable compact disc read-only memory (CD-ROM), a digital versatile disk (DVD). Alternatively, optionally, the client application database is implemented at a remote memory associated with the at least one client device. The remote memory may, for example, be a cloud-based memory.

Throughout the present disclosure, the term "target server" refers to hardware, software, firmware, or a combination of these for backing up and storing data of at least one client application in real time or near real time. In such a case, the target server always has an up-to-date version of the data. Optionally, the target server comprises a data repository for storing the data in an organized (namely, structured) manner, thereby, allowing for easy access (namely, retrieval) and updation of said data.

Optionally, the target server is communicably coupled to the at least one client device via a communication network. It will be appreciated that the communication network may be wired, wireless, or a combination thereof. Examples of the communication network may include, but are not limited to, Internet, a local network (such as, a TCP/IP-based network, an Ethernet-based local area network, an Ethernet-based personal area network, a Wi-Fi network, and the like), Wide Area Networks (WANs), Metropolitan Area Networks (MANs), a telecommunication network, and a radio network. Optionally, the target server and the client application are connected via an Application Programming Interface (API) in the communication network.

It will be appreciated that the term "start-up" refers to a launch (namely, a start) of the client application on the at least one client device. In some cases, upon the start-up, the client application is launched for a first time ever by a new user. Such a start-up of the client application may be performed upon installation of the client application on the at least one device. In other cases, upon the start-up, the client application is launched for use by an existing user who has already used the client application earlier. It will also be appreciated that the data may or may not be present in the client application database, upon the start-up of the client application. Depending on presence or absence of the data, different technical approaches are intelligently adopted and implemented by the client application for updating the data. As an example, when the client application is launched for the first time ever by the new user, it may be determined that no data is present in the client application database. Alternatively, optionally, when the client application has previously been used by the existing user on his/her client device(s), it may be determined that the data is present in the client application database.

Throughout the present disclosure, the term "communication thread" refers to a string of electronic communication between two or more members of the at least one communication thread. Optionally, the at least one communication thread comprises at least two members, wherein the at least two members include the user and at least one other member. It will be appreciated that a same user may be a member of two or more communication threads. When the at least one communication thread comprises two members, the two members could communicate on a one-to-one basis, whereas when the at least one communication thread comprises at least three members, the at least three members could communicate on a one-to-all basis, a one-to-one basis, or similar.

Referring to the first example, the user may be a member of 3 communication threads A1, A2, and A3 in the business communication application. The communication thread A1 may comprise two members, namely, the user and a member B1. The communication thread A2 may comprise two members, namely, the user and a member B2. The communication thread A3 may comprise three members, namely, the user, the member B1, and the member B2. It will be appreciated that the content of the at least one communication thread could be a text (such as a message, alphanumeric data, and similar), an image, a data file (such as a text document), a video, an audio (such a voice message), an emotion icon, an electronic mail, and the like. The term "communication thread" may be referred to as a "chat" or a "communication channel".

Notably, when the client application database comprises the data, the updated version of the data is obtained (by the client application) from the target server using the first process. The updated version of the data present in the client application database is required as the content of the at least one communication thread dynamically keeps changing with time, thereby making the data present in the client application database obsolete at a time of start-up of the client application.

Optionally, when obtaining from the target server, the updated version of the data using the first process, the client application is configured to:
obtain a list of updates that have been made to the data since a time of storing the data in the client application database;
determine whether an incremental update of the data is feasible or not, based on the list of updates;
when the incremental update of the data is not feasible, delete the data stored in the client application database, and receive a most recent data slice of the at least one communication thread;
when the incremental update of the data is feasible, receive an incremental data slice of the at least one communication thread; and
use the most recent data slice or the incremental data slice to generate the updated version of the data.

Optionally, the list of updates comprises identification information of the at least one communication thread along with a status of the at least one communication thread. Optionally, in this regard, the status of a given communication thread is one of: added, removed, updated. When the status of the given communication thread is "added", it indicates that the user became a member of the given communication thread. When the status of the given communication thread is "removed", it indicates that the user stopped being a member of the given communication thread. When the status of the given communication thread is "updated", it indicates that the user continued to be a member of the given communication thread and content of the given communication thread was updated.

Optionally, the identification information of a given communication thread comprises at least one of: an identification number, an identification code, a name, of the given communication thread. Optionally, the identification code of the given communication thread is in form of a string of alphanumeric and special characters. Referring to the first example, the identification number of the communication thread A1 may be "12345", the identification code of the communication thread A2 may be "#C6D7", and the name of the communication thread A3 may be "ABC BUSSINESS GROUP".

Optionally, when obtaining the list of updates, the client application is configured to:
send, to the target server, an update request; and
receive, from the target server, the list of updates that is generated based on the update request.

Optionally, in this regard, the client application uses an API handle for obtaining the list of updates. This API handle facilitates communication between the client application and the target server. The API handle trusts the client application to provide, in the update request, full identification information of all communication threads that the client application is aware of.

Optionally, the update request comprises identification information of a plurality of communication threads. Alternatively, optionally, the update request comprises identification information of a single communication thread. Yet alternatively, optionally, the update request does not comprise identification information of any communication thread.

It will be appreciated that when determining whether the incremental update of the data is feasible or not, based on the list of updates, the client application evaluates how much updates to the data have been accumulated on the target server. Greater the amount of the updates to the data, lesser is a feasibility of the incremental update of the data. This is because receiving large amount of the updates to the data from the target server would be extremely time-consuming and would burden the communication network between the target server and the client device.

Optionally, when the list of updates indicates that a considerable amount of updates to the data are accumulated on the target server, it is determined that the incremental update of the data is not feasible. This considerable amount of the updates to the data may have accumulated on the target server since a last session of using the client application (i.e., a last time the user has accessed the client application on the at least one client device). The amount of updates to the data depends on how actively the members of the at least one communication thread communicate with each other on said thread. In such a case, instead of loading the considerable amount of the updates to the data in the client application database, the client application is configured to erase the data already stored on the client application database and only receive the most recent data slice of the at least one communication thread from the target server. The term "most recent data slice" refers to a data portion comprising latest (i.e., up-to-date) content of the at least one communication thread. Advantageously, this most recent data slice serves as the updated version of the data, thereby facilitating the system in implementing loading of the data in real time or near real time with minimal latency/delay which is imperceptible to the user. This improves user's experience when the user uses the client application as an up-to-date content of the at least one communication thread would be readily presented to the user as soon as the user starts using the client application on the at least one client device. Moreover, when receiving the most recent data slice from the target server, minimal bandwidth, lesser power, and shorter loading time is required, as compared to that associated with receiving the considerable amount of the data.

Alternatively, optionally, when the list of updates indicates that a minimal amount of updates to the data are accumulated on the target server, it is determined that the incremental update of the data is feasible. This minimal amount of the data may have accumulated on the target server since a last session of using the client application on the at least one client device. In such a case, the data already stored in the client application database is not deleted and is simply updated using the incremental data slice. The term "incremental data slice" refers to a data portion comprising incremental content of the at least one communication thread which succeeds and is additional to the content of the at least one communication thread that is already present in the client application database. The incremental data slice can be added to the data (already) stored in the client application database to generate the updated version of the data. Advantageously, this facilitates in generating the updated version of the data using the incremental data slice, in real time or near real time with minimal any latency/delay which is imperceptible to the user. This improves user's experience when the user uses the client application as an up-to-date content of the at least one communication thread would be readily presented to the user as soon as the user starts using the client application on the at least one client device. Moreover, when receiving the incremental data slice from the target server, minimal bandwidth, low power, and minimum loading time is required.

Notably, when the client application database does not comprise the data, the updated version of the data is obtained from the target server, by the client application, using the second process. The updated version of the data is required as absence of the data in the client application database would adversely impact the user's experience of using the client application and such an impact would be perceivable by the user. The second process facilitates in intelligently loading the data in the client application database, thereby avoiding the aforesaid undesirable situation.

Optionally, when obtaining from the target server, the updated version of the data using the second process, the client application is configured to:
  receive a first list including identification information of the at least one communication thread, and a second list of members of the at least one communication thread;
  receive a most recent data slice of the at least one communication thread, based on the first list and the second list; and
  use the most recent data slice as the updated version of the data.

Optionally, when receiving the first list and the second list, the client application is configured to use an API handle to:
  send, to the target server, a request for receiving the first list and the second list; and
  obtain, from the target server, the first list and the second list.

Optionally, the most recent data slice comprises latest content of the at least one communication thread referred in the first list, the latest content being exchanged in the at least one communication thread by at least one of the members in the second list. The most recent data slice, advantageously serves as the updated version of the data, thereby facilitating the system in implementing loading of the data in real time or near real time with minimal latency/delay which is imperceptible to the user. This improves the user's experience when the user uses the client application as an up-to-date content of the at least one communication thread would be readily presented to the user as soon as the user starts using the client application on the at least one client device. Moreover, when receiving the most recent data slice from the target server, minimal bandwidth, low power, and minimum loading time is required.

Referring to and continuing with the first example, the first list may include the identification information of the communication threads A1, A2, and A3. The second list may include details of all the members (i.e., the user, B1, and B2) of the communication threads A1, A2, and A3. Herein, the business communication application may receive most recent messages exchanged in the communication threads A1, A2, and A3. For example, the most recent messages exchanged in the communication threads A1, A2, and A3 may be by the members A1, A2, and A1, respectively.

Optionally, upon sync-up, the client application is configured to obtain from the target server, the updated version of the data using a third process, wherein the third process is based on incremental updates. The term "sync-up" refers to synchronization of the client application executing on the at least one client device with the target server. It will be appreciated that the client application database may have no data or may have some data (which may or may not be in updated form) at a time of sync-up of the client application. Optionally, the client application syncs-up with the target server in a manner that any change in the data stored at the client application database is automatically updated for the client application, to maintain time-consistency of the data. It will be appreciated that optionally the sync-up of the client application occurs during the use of the client application on the at least one client device. In such a case, some amount of the data is already present in the client application database.

Optionally, the sync-up of the client application is performed upon one of: re-connection of the client application with the target server after a temporary disruption of communication therebetween, a transition of the client application from background to foreground. During the temporary disruption of communication between the client application and the target server, the client application would be out of sync with the target server and the data present in the client application database would not be updated continuously. Upon re-connection of the client application with the target server, the data present in the client application databased would require updating to accurately represent updates that may have been made to the data during the temporary disruption. Moreover, the user using the client application may move the client application in the background, for example, in order to use another application on the at least one client device. In such a case, the client application would be out of sync with the target server and the data present in the client application database would not be updated. When the client application transitions from the background to the foreground, it indicates that the user is actively using the client application and therefore, the data present in the client application databased requires updating. It will be appreciated that optionally when the sync-up of the client application is performed, the data for the client application is automatically updated (using the third process) in real time or near real time, to maintain time-consistency of the data and to improve the user's experience.

Optionally, when obtaining from the target server, the updated version of the data using the third process, the client application is configured to:
  obtain a list of updates that have been made to the data since a time of storing the data in the client application database;
  receive an incremental data slice of the at least one communication thread, based on the list of updates; and
  use the incremental data slice to generate the updated version of the data.

Optionally, the incremental data slice of the at least one communication thread comprises incremental content of the at least one communication thread referred in the list of updates which succeeds and is additional to the content of the at least one communication thread that is already present in the client application database. The incremental data slice can be added to the data (already) stored in the client application database to generate the updated version of the data. Advantageously, this facilitates in generating the updated version of the data using the incremental data slice to efficiently enable the sync-up of the client application, in real time or near real time with minimal latency/delay which is imperceptible to the user. This improves the user's experience when the user uses the client application, even upon occurrences such as the temporary disruption of communication and/or the transition of the client application from background to foreground.

Optionally, when receiving a given data slice of the at least one communication thread, the client application is configured to receive, from the target server, at least one page comprising a predefined amount of the content of the at least one communication thread in an iterative manner, wherein one page is received at each iteration. It will be appreciated that the given data slice is any of: the most recent data slice, the incremental data slice. The given data slice is received using an API handle. Optionally, the given data slice comprises the at least one page. It is to be understood that a given page comprises only a portion of the predefined amount of the content of the at least one communication thread (for example, a predefined number of messages of chats), and the client application may not be able to receive an entirety of the predefined amount of the content of the at least one communication thread at once. At each iteration, the client application only receives the portion of the predefined amount of the content of the at least one communication thread. In such a case, the client application is optionally configured to receive the remaining portions of the predefined amount of the content of the at least one communication thread by iteratively sending request(s) to the target server, until the remaining portions of the predefined amount of the content of the at least one communication thread is entirely received by the client application. In this iterative page-wise manner, the data stored in the client application database is iteratively updated in small increments, thereby minimizing time-lag that conventionally occurs during data updating.

Optionally, for the given data slice, the predefined amount of the content of the at least one communication thread is ordered in an increasing order of date and/or time. In such a case, a page including most recent content amongst the predefined amount of the content is arranged at an end of the given data slice, while a page including oldest content amongst the predefined amount of the content is arranged at a beginning of the given data slice.

Optionally, the at least one page is received in a decreasing order of recency of content included therein. In this regard, the page including the most recent content amongst the predefined amount of the content is received first, followed by a page including next-recent content amongst the predefined amount of the content, and so on, until at last the page including the oldest content amongst the predefined amount of the content is received.

Optionally, the predefined amount of the content of the at least one communication thread which is included in the at least one page depends on a size of a given page and a number of pages in the given data slice. As an example, the size of the given page may be 4 kilobytes and the number of pages in the given data slice may be five. Therefore, the predefined amount of the content of the at least one communication thread has a size of 20 kilobytes of data. The predefined amount of the content of the at least one communication thread may include, for example, approximately 125 text messages (of about 160 characters in each message).

Optionally, the client application is further configured to present the updated version of the data at an interactive user interface rendered on the at least one client device. Optionally, the user views, via the interactive user interface, the updated version of the data. The interactive user interface is a graphical user interface pertaining to the client application, and the user interacts with the client application using the interactive user interface. Optionally, the user prioritises, via the interactive user interface, an order of receiving the updated version of the data for at least two communication threads. Optionally, in this regard, the client application is configured to receive, from the target server, the updated version of the data for the at least two communication threads in a decreasing order of priorities. It will be appreciated that the updated version of the data is presented at the interactive user interface in real time or near real time with minimal latency/delay which is imperceptible to the user, thereby improving user's experience when the user uses the client application.

Referring and continuing to the first example, the user may access the communication thread A1, then the communication thread A2, and then the communication thread A3. Herein, the business communication application may be configured to receive, from the target server, the updated version of the data for the communication thread A1, then for the communication thread A2, and then for the communication thread A3. Moreover, when the user scrolls up a given communication thread to access a historical content of the given communication thread, the historical content of the given communication thread may be received, by the business communication application, from the target server, in order of most recent content to most old content.

The present disclosure also relates to the method as described above. Various embodiments and variants disclosed above, with respect to the aforementioned system, apply mutatis mutandis to the method.

Optionally, the method further comprises determining whether the client application has started-up or synced-up. Optionally, the client application is configured to determine whether it has started-up or synced-up. Upon start-up of the client application, the at least one client device establishes a connection with the target server for a first time. In such a case, the client application is optionally configured to send, to the target server, a connection request for establishing the connection of the at least one client device with the target server for the first time. Therefore, in this manner, it is determined that the client application has started-up. Upon sync-up of the client application, a connection between the at least one client device and the target server is restored or refreshed as the at least one client device is pre-connected with the target server. In such a case, the client application need not send any connection request to the target server for establishing the connection of the at least one client device with the target server. Therefore, in this manner, it is determined that the client application has synced-up.

Optionally, the method further comprises: upon sync-up of the client application, obtaining from the target server, the updated version of the data using a third process, wherein the third process is based on incremental updates.

Optionally, the method further comprises presenting the updated version of the data at an interactive user interface rendered on the at least one client device.

Optionally, in the method, the step of obtaining from the target server, the updated version of the data using the first process comprises:

obtaining a list of updates that have been made to the data since a time of storing the data in the client application database;

determining whether an incremental update of the data is feasible or not, based on the list of updates;

when the incremental update of the data is not feasible, deleting the data stored in the client application database, and receiving a most recent data slice of the at least one communication thread;

when the incremental update of the data is feasible, receiving an incremental data slice of the at least one communication thread; and using the most recent data slice or the incremental data slice to generate the updated version of the data.

Optionally, in the method, the step of obtaining from the target server, the updated version of the data using the second process comprises:

receiving a first list including identification information of the at least one communication thread, and a second list of members of the at least one communication thread;

receiving a most recent data slice of the at least one communication thread, based on the first list and the second list; and using the most recent data slice as the updated version of the data.

Optionally, in the method, the step of obtaining from the target server, the updated version of the data using the third process comprises:

obtaining a list of updates that have been made to the data since a time of storing the data in the client application database;

receiving an incremental data slice of the at least one communication thread, based on the list of updates; and using the incremental data slice to generate the updated version of the data.

Optionally, in the method, the step of receiving a given data slice of the at least one communication thread comprises receiving, from the target server, at least one page comprising a predefined amount of the content of the at least one communication thread in an iterative manner, wherein one page is received at each iteration.

Optionally, in the method, the sync-up of the client application is performed upon one of: re-connection of the client application with the target server after a temporary disruption of communication therebetween, a transition of the client application from background to foreground.

The present disclosure also relates to the client device as described above. Various embodiments and variants disclosed above, with respect to the aforementioned system and method, apply mutatis mutandis to the computer program product.

Throughout the present disclosure, the term "computer program product" refers to a software product comprising program instructions that are recorded on the non-transitory machine-readable data storage medium, wherein the software product is executable upon a computing hardware (i.e., the processing device) for implementing the aforementioned steps of the method for implementing intelligent loading of the data.

The program instructions stored on non-transitory machine-readable data storage medium can direct the processing device to function in a particular manner, such that the processing device executes processing steps for implementing intelligent loading of data. Examples of the non-transitory machine-readable data storage medium includes, but are not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Throughout the present disclosure, the term "processing device" refers to a device that is capable of processing the program instructions of the computer program product. Optionally, the processing device is implemented as a part of the client device. The processing device may, for example, be a microprocessor, a microcontroller, a processing unit, or similar.

Optionally, in the computer program product, the program instructions further cause the processing device to, upon sync-up of the client application, obtain from the target server, the updated version of the data using a third process, wherein the third process is based on incremental updates.

The present disclosure also relates to the client device as described above. Various embodiments and variants disclosed above, with respect to the aforementioned system, method, and computer program product, apply mutatis mutandis to the client device.

Optionally, upon sync-up of the client application, the client application is configured to obtain from the target server, the updated version of the data using a third process, wherein the third process is based on incremental updates.

The present disclosure also relates to the target server as described above. Various embodiments and variants disclosed above, with respect to the aforementioned system, method, computer program product, and client device, apply mutatis mutandis to the target server.

Optionally, upon sync-up of the client application, the target server is configured to send, to the client application, the updated version of the data using a third process, wherein the third process is based on incremental updates.

DETAILED DESCRIPTION OF THE DRAWINGS

Referring to FIG. 1, illustrated is a block diagram of architecture of a system 100 for implementing intelligent loading of data in a client application database 102, in accordance with an embodiment of the present disclosure. The system 100 comprises at least one client device (depicted as a client device 104) and a target server 106 communicably coupled to the client device 104. The client device 104 is configured to execute a client application 108 having the client application database 102 associated therewith.

Figure 2:
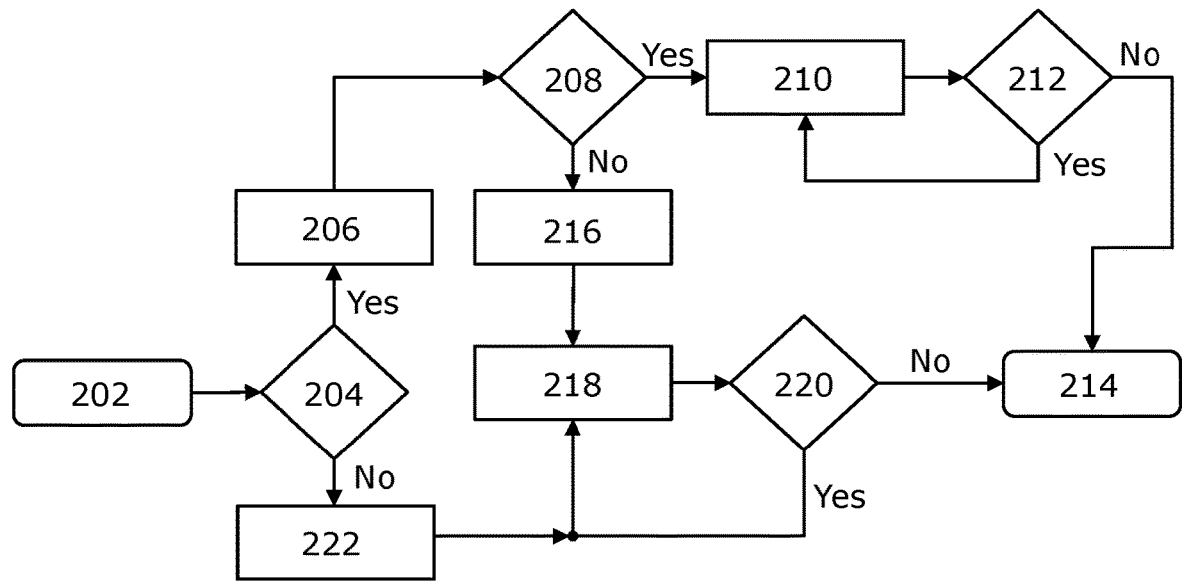
FIG. 2 illustrates an exemplary process flow upon start-up of a client application, in accordance with an embodiment of the present disclosure.

Referring to FIG. 2, illustrated is an exemplary process flow upon start-up of a client application, in accordance with an embodiment of the present disclosure. At step 202, the client application starts-up on at least one client device. At step 204, it is determined if data is present in a client application database associated with the client application.

In one case, when the data is present in the client application database, then at step 206, a list of updates that have been made to the data since a time of storing the data in the client application database is obtained by the client application, from a target server. Then, at step 208, it is determined if an incremental update of the data is feasible, based on the list of updates. In a first case, when the incremental update of the data is feasible, then at step 210, an incremental data slice of at least one communication thread is received by the client application, from the target server. Then, at step 212, it is checked if more data is available for incremental update. If yes, then the step 210 is repeated. If no, then at step 214, the incremental data slice is used, by the client application, to generate an updated version of the data. In a second case, when the incremental update of the data is not feasible, then at step 216, the data stored in the client application database is deleted (or wiped). Then, at step 218, a most recent data slice of the at least one communication thread is received by the client application, from the target server. Then, at step 220, it is checked if more recent data slice(s) of the at least one communication thread is/are available. If yes, then the step 218 is repeated. If no, then at step 214, the most recent data slice is used, by the client application, to generate the updated version of the data.

In another case, when the data is not present in the client application database, then at step 222, a first list including identification information of the at least one communication thread, and a second list of members of the at least one communication thread received is received by the client application, from the target server. Then at step 218, the most recent data slice of the at least one communication thread is received by the client application, from the target server, based on the first list and the second list. Then, the steps 220 and 214 are performed.

Figure 3:
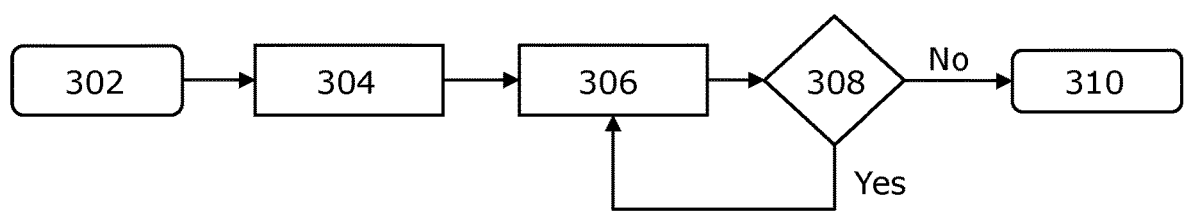
FIG. 3 illustrates an exemplary process flow upon sync-up of a client application, in accordance with an embodiment of the present disclosure.

Referring to FIG. 3, illustrated is an exemplary process flow upon sync-up of a client application, in accordance with an embodiment of the present disclosure. At step 302, the client application syncs-up on at least one client device. At step 304, a list of updates that have been made to data since a time of storing the data in a client application database associated with the client application is obtained by the client application, from the target server. At step 306, an incremental data slice of at least one communication thread is received by the client application, from the target server, based on the list of updates. Then, at step 308, it is checked if more data is available for incremental update. If yes, then the step 306 is repeated. If no, then at step 310, the incremental data slice is used, by the client application, to generate an updated version of the data.

Figure 4:
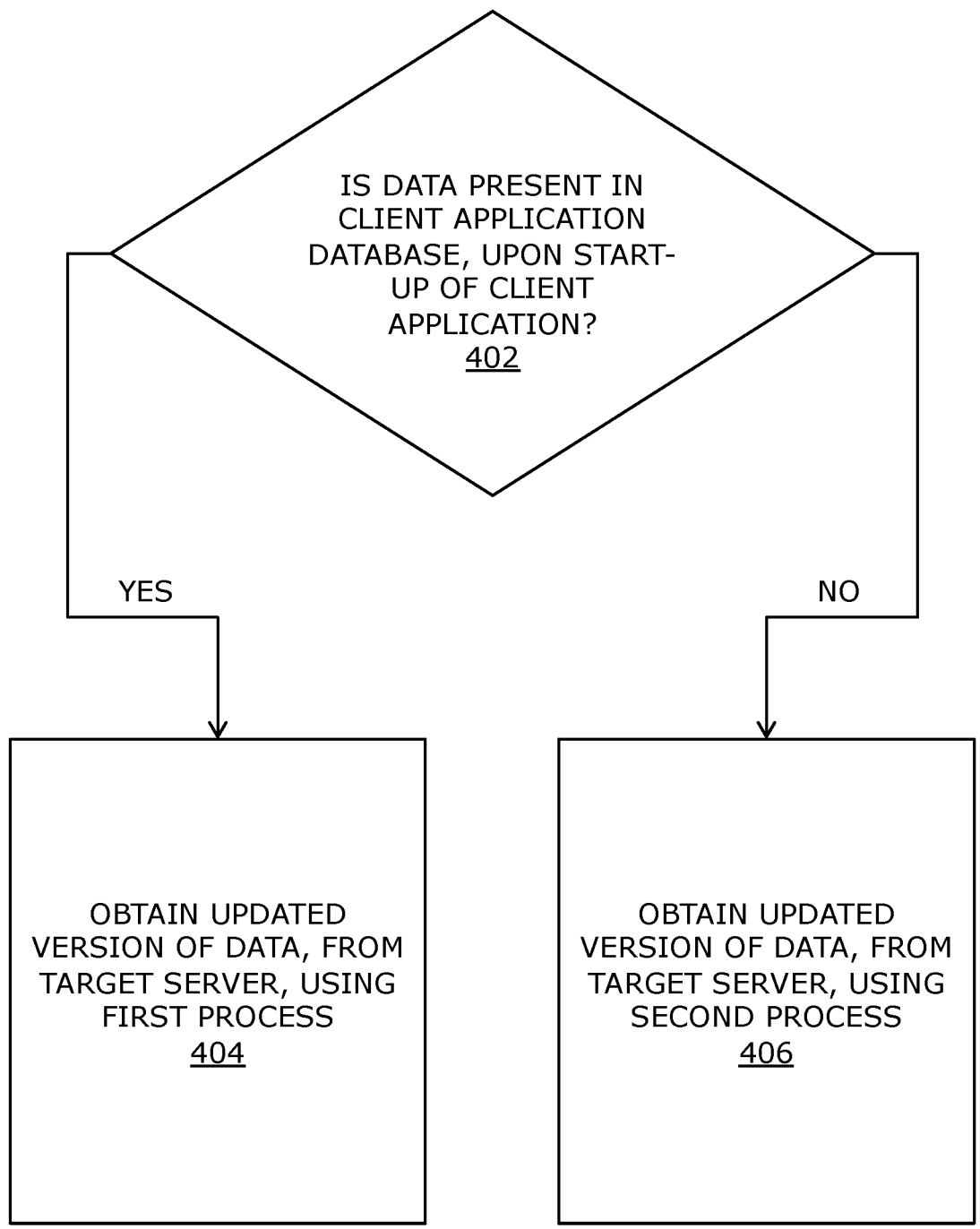
FIG. 4 illustrates steps of a method for implementing intelligent loading of data in a client application database, in accordance with an embodiment of the present disclosure.

Referring to FIG. 4, illustrated are steps of a method for implementing intelligent loading of data in a client application database, in accordance with an embodiment of the present disclosure. The method is implemented by a system comprising at least one client device configured to execute a client application, the client application having a client application database associated therewith, and a target server communicably coupled to the at least one client device. Upon start-up of the client application, at step 402, it is determined that whether the data is present or not in the client application database, the data comprising content of at least one communication thread, wherein a user using the at least one client device is a member of the at least one communication thread. When it is determined that the data is present in the client application database, at step 404, an updated version of the data is obtained, from the target server, using a first process, wherein the first process is based on recent updates or incremental updates. Otherwise, when it is determined that the data is not present in the client application database, at step 406, the updated version of the data is obtained, from the target server, using a second process, wherein the second process is based on recent updates.

The steps 402 to 406 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for implementing intelligent loading of data in a client application database, the system comprising:
at least one client device configured to execute a client application, the client application being associated with the client application database; and
a target server communicably coupled to the at least one client device,
wherein, upon start-up, the client application is configured to:
determine whether the data is present or not in the client application database, the data comprising content of at least one communication thread, wherein a user using the client application on the at least one client device is a member of the at least one communication thread;
determined that the data is present in the client application database, obtain from the target server an updated version of the data using a first process, wherein
the first process is based on updates accumulated on the target server since a last session of using the client application,
obtained from the target server, the updated version of the data using the first process, the client application is further configured to:
obtain a list of updates that have been made to the data since a time of storing the data in the client application database,
determine whether to execute an incremental update of the data or not, based on evaluating an amount of updates accumulated on the target server,
determined that the incremental update of the data is not executable, delete the data stored in the client application database, and receive a most recent data slice of the at least one communication thread,
determined that the incremental update of the data is executable, receive an incremental data slice of the at least one communication thread, and use the most recent data slice or the incremental data slice to generate the updated version of the data; and
determined that the data is not present in the client application database, obtain from the target server, the updated version of the data using a second process, wherein the second process is based on updates accumulated on the target server since the last session of using the client application.

2. The system of claim 1, wherein, upon sync-up, the client application is configured to obtain from the target server, the updated version of the data using a third process, wherein the third process is based on incremental updates.

3. The system of claim 2, wherein obtained from the target server, the updated version of the data using the third process, the client application is further configured to:
 obtain a list of updates that have been made to the data since a time of storing the data in the client application database;
 receive an incremental data slice of the at least one communication thread, based on the list of updates; and
 use the incremental data slice to generate the updated version of the data.

4. The system of claim 2, wherein the sync-up of the client application is performed upon one of: re-connection of the client application with the target server after a temporary disruption of communication therebetween, a transition of the client application from background to foreground.

5. The system of claim 1, wherein the client application is further configured to present the updated version of the data at an interactive user interface rendered on the at least one client device.

6. The system of claim 1, wherein obtained from the target server, the updated version of the data using the second process, the client application is further configured to:
 receive a first list including identification information of the at least one communication thread, and a second list of members of the at least one communication thread;
 receive a most recent data slice of the at least one communication thread, based on the first list and the second list; and
 use the most recent data slice as the updated version of the data.

7. The system of claim 1, wherein received a given data slice of the at least one communication thread, the client application is further configured to receive, from the target server, at least one page comprising a predefined amount of the content of the at least one communication thread in an iterative manner, wherein one page is received at each iteration.

8. A method for implementing intelligent loading of data in a client application database, the method being implemented by a system comprising at least one client device configured to execute a client application, the client application having a client application database associated therewith, and a target server communicably coupled to the at least one client device, the method comprising:
 upon start-up of the client application,
 determining whether the data is present or not in the client application database, the data comprising content of at least one communication thread, wherein a user using the at least one client device is a member of the at least one communication thread;
  determined that the data is present in the client application database, obtaining from the target server an updated version of the data using a first process, wherein
   the first process is based on updates accumulated on the target server since a last session of using the client application,
   the step of obtaining from the target server, the updated version of the data using the first process further comprises:
    obtaining a list of updates that have been made to the data since a time of storing the data in the client application database,
    determining whether to execute an incremental update of the data or not, based on evaluating an amount of updates accumulated on the target server,
    determined that the incremental update of the data is not executable, deleting the data stored in the client application database, and receiving a most recent data slice of the at least one communication thread,
    determined that the incremental update of the data is executable, receiving an incremental data slice of the at least one communication thread, and
    using the most recent data slice or the incremental data slice to generate the updated version of the data; and
  determined that the data is not present in the client application database, obtaining from the target server, the updated version of the data using a second process, wherein the second process is based on updates accumulated on the target server since the last session of using the client application.

9. The method of claim 8, further comprising: upon sync-up of the client application, obtaining from the target server, the updated version of the data using a third process, wherein the third process is based on incremental updates.

10. The method of claim 9, wherein the step of obtaining from the target server, the updated version of the data using the third process comprises:
 obtaining a list of updates that have been made to the data since a time of storing the data in the client application database;
 receiving an incremental data slice of the at least one communication thread, based on the list of updates; and
 using the incremental data slice to generate the updated version of the data.

11. The method of claim 9, wherein the sync-up of the client application is performed upon one of: re-connection of the client application with the target server after a temporary disruption of communication therebetween, a transition of the client application from background to foreground.

12. The method of claim 8, further comprising presenting the updated version of the data at an interactive user interface rendered on the at least one client device.

13. The method of claim 8, wherein the step of obtaining from the target server, the updated version of the data using the second process comprises:
 receiving a first list including identification information of the at least one communication thread, and a second list of members of the at least one communication thread;
 receiving a most recent data slice of the at least one communication thread, based on the first list and the second list; and
 using the most recent data slice as the updated version of the data.

14. The method of claim 8, wherein the step of receiving a given data slice of the at least one communication thread comprises receiving, from the target server, at least one page comprising a predefined amount of the content of the at least one communication thread in an iterative manner, wherein one page is received at each iteration.

15. A computer program product for implementing intelligent loading of data in a client application database, the computer program product comprising a non-transitory machine-readable data storage medium having stored thereon program instructions that, accessed by a processing device, cause the processing device to:
  upon start-up of a client application,
  determine whether the data is present or not in the client application database, the data comprising content of at least one communication thread, wherein a user using the processing device is a member of the at least one communication thread;
  determined that the data is present in the client application database, obtain from the target server an updated version of the data using a first process, wherein
    the first process is based on updates accumulated on the target server since a last session of using the client application,
    obtained from the target server, the updated version of the data using the first process, the client application is further configured to:
      obtain a list of updates that have been made to the data since a time of storing the data in the client application database,
      determine whether to execute an incremental update of the data or not, based on evaluating an amount of updates accumulated on the target server,
      determined that the incremental update of the data is not executable, delete the data stored in the client application database, and receive a most recent data slice of the at least one communication thread,
      determined that the incremental update of the data is executable, receive an incremental data slice of the at least one communication thread, and use the most recent data slice or the incremental data slice to generate the updated version of the data; and
  determined that the data is not present in the client application database, obtain from the target server, the updated version of the data using a second process, wherein the second process is based on updates accumulated on the target server since the last session of using the client application.

16. A client device arranged to be used in a system for implementing intelligent loading of data in a client application database, the system comprising at least one client device configured to execute a client application, wherein the client application is associated with the client application database, and a target server communicably coupled to the at least one client device,
  wherein, upon start-up, the client application is configured to:
  determine whether the data is present or not in the client application database, the data comprising content of at least one communication thread, wherein a user using the client application on the at least one client device is a member of the at least one communication thread;
  determined that the data is present in the client application database, obtain from the target server an updated version of the data using a first process, wherein
    the first process is based on updates accumulated on the target server since a last session of using the client application,
    obtained from the target server, the updated version of the data using the first process, the client application is further configured to:
      obtain a list of updates that have been made to the data since a time of storing the data in the client application database,
      determine whether to execute an incremental update of the data or not, based on evaluating an amount of updates accumulated on the target server,
      determined that the incremental update of the data is not executable, delete the data stored in the client application database, and receive a most recent data slice of the at least one communication thread,
      determined that the incremental update of the data is executable, receive an incremental data slice of the at least one communication thread, and use the most recent data slice or the incremental data slice to generate the updated version of the data; and
  determined that the data is not present in the client application database, obtain from the target server, the updated version of the data using a second process, wherein the second process is based on updates accumulated on the target server since the last session of using the client application.

17. A target server arranged to be used in a system for implementing intelligent loading of data in a client application database, the system comprising at least one client device configured to execute a client application, wherein the client application is associated with the client application database, and the target server communicably coupled to the at least one client device,
  wherein, upon start-up of the client application:
  the client application is configured to determine whether the data is present or not in the client application database, the data comprising content of at least one communication thread, wherein a user using the client application on the at least one client device is a member of the at least one communication thread;
  determined that the data is present in the client application database, the target server is configured to send to the client application, an updated version of the data using a first process, wherein the first process is based on updates accumulated on the target server since a last session of using the client application,
  obtained from the target server, the updated version of the data using the first process, the client application is further configured to:
    obtain a list of updates that have been made to the data since a time of storing the data in the client application database,
    determine whether to execute an incremental update of the data or not, based on evaluating an amount of updates accumulated on the target server,
    determined that the incremental update of the data is not executable, delete the data stored in the client application database, and receive a most recent data slice of the at least one communication thread,
    determined that the incremental update of the data is executable, receive an incremental data slice of the at least one communication thread, and use the most recent data slice or the incremental data slice to generate the updated version of the data; and
  determined that the data is not present in the client application database, the target server is configured to send to the client application, an updated version of the data using a second process, wherein the second process is based on updates accumulated on the target server since the last session of using the client application.

* * * * *